United States Patent
Xing et al.

(10) Patent No.: US 10,432,348 B2
(45) Date of Patent: Oct. 1, 2019

(54) WIRELESS SIGNAL TRANSMISSION METHOD AND SYSTEM

(71) Applicant: ZTE CORPORATION, Guangdong (CN)

(72) Inventors: Weimin Xing, Guangdong (CN); Kaiying Lv, Guangdong (CN); Kaibo Tian, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/737,854

(22) PCT Filed: Aug. 22, 2016

(86) PCT No.: PCT/CN2016/096273
§ 371 (c)(1),
(2) Date: Dec. 19, 2017

(87) PCT Pub. No.: WO2016/206652
PCT Pub. Date: Dec. 29, 2016

(65) Prior Publication Data
US 2019/0007161 A1    Jan. 3, 2019

(30) Foreign Application Priority Data

Jun. 23, 2015   (CN) .......................... 2015 1 0349123
Sep. 6, 2015    (CN) .......................... 2015 1 0561510

(51) Int. Cl.
*H04L 1/00* (2006.01)
*H04L 5/00* (2006.01)
(Continued)

(52) U.S. Cl.
CPC .......... *H04L 1/0006* (2013.01); *H04L 1/0003* (2013.01); *H04L 5/0005* (2013.01);
(Continued)

(58) Field of Classification Search
CPC ... H04L 1/0006; H04L 1/0003; H04L 5/0053; H04L 5/0005; H04L 5/0091;
(Continued)

(56) References Cited

U.S. PATENT DOCUMENTS

| 2011/0051705 A1 | 3/2011 | Jones, IV et al. |
| 2014/0307612 A1 | 10/2014 | Vermani et al. |

(Continued)

FOREIGN PATENT DOCUMENTS

| CN | 101179290 A | 5/2008 |
| CN | 101399601 A | 4/2009 |

(Continued)

OTHER PUBLICATIONS

Extended European Supplementary Search Report dated Mar. 20, 2018 received in European Patent Application No. 16 81 3768.5.

(Continued)

*Primary Examiner* — Thai Nguyen
(74) *Attorney, Agent, or Firm* — Scully Scott Murphy & Presser

(57) ABSTRACT

A wireless signal transmission method includes: transmitting, by a transmitting station, a wireless signal to a plurality of receiving stations, wherein the wireless signal comprises a first portion and a second portion, the first portion being a trigger frame with a first type of frame format which can be independently decoded, the second portion being a specific signal with a second type of frame format; and receiving, by the transmitting station, a radio frame transmitted by at least one of the plurality of receiving stations. The wireless signal transmission method provided by the present disclosure are used to solve the problems in the prior art that a trigger frame is not able to complete transmission resources reservation (Continued)

and trigger multi-user transmission at the same time as satisfying the training accuracy required for uplink multi-user transmission.

15 Claims, 4 Drawing Sheets

(51) Int. Cl.
*H04W 72/04* (2009.01)
*H04W 74/08* (2009.01)
*H04W 72/12* (2009.01)
*H04W 74/00* (2009.01)
*H04W 84/12* (2009.01)
*H04W 80/02* (2009.01)

(52) U.S. Cl.
CPC .......... *H04L 5/0053* (2013.01); *H04L 5/0091* (2013.01); *H04W 72/0446* (2013.01); *H04W 74/0808* (2013.01); *H04W 72/1289* (2013.01); *H04W 74/002* (2013.01); *H04W 80/02* (2013.01); *H04W 84/12* (2013.01)

(58) Field of Classification Search
CPC ......... H04W 72/0446; H04W 74/0808; H04W 80/02; H04W 74/002; H04W 72/1289; H04W 84/12
See application file for complete search history.

(56) References Cited

U.S. PATENT DOCUMENTS

| | | | |
|---|---|---|---|
| 2016/0315681 A1* | 10/2016 | Moon | H04B 7/0621 |
| 2017/0280462 A1* | 9/2017 | Chun | H04L 1/00 |
| 2018/0007661 A1* | 1/2018 | Chun | H04L 1/1861 |

FOREIGN PATENT DOCUMENTS

| | | |
|---|---|---|
| CN | 101931456 A | 12/2010 |
| CN | 102238606 A | 11/2011 |
| EP | 3 157 300 A1 | 4/2017 |
| WO | 2015/070230 A1 | 5/2015 |
| WO | 2016/090372 A1 | 6/2016 |

OTHER PUBLICATIONS

International Search Report dated Nov. 22, 2016 issued in PCT/CN2016/096273.

* cited by examiner

WIRELESS SIGNAL TRANSMISSION METHOD AND SYSTEM

CROSS REFERENCE

This application is the 371 application of PCT Application No. PCT/CN2016/096273 filed Aug. 22, 2016, which is based upon and claims priority to Chinese Patent Applications No. 201510349123.0 filed on Jun. 23, 2015 and No. 201510561510.0 file on Sep. 6, 2015, the entire contents thereof are incorporated herein by reference.

TECHNICAL FIELD

The present disclosure relates to the field of wireless communication, and more particularly, to a wireless signal transmission method and system.

BACKGROUND

At present, as a growing number of people use wireless local area networks (WLAN) to carry out data communication, the WLAN network load is continuously increased. Furthermore, as the number of uses is increasing, an obviously decreasing tendency may appear in the WLAN network efficiency, and this problem cannot be solved merely by increasing rate. Therefore, Institute of Electrical and Electronics Engineers (IEEE) organizes a 11ax task group (also known as high-efficiency WLAN group) dedicated to solving the problem of the WLAN network efficiency. As one of alternative technologies for solving the network efficiency, a parallel multi-user data transmission technology has drawn extensive attention and study.

At present, the parallel multi-user data transmission technology studied by the 11ax group includes a multi-user multiple-input multiple-output (MU-MIMO) technology (spatial domain multiple access), orthogonal frequency division multiple access (OFDMA) technology (frequency domain multiple access), and interleave-division multiple-access (IDMA) technology (code division multiple access) technology.

FIG. 1 is an exemplary diagram of a WLAN basic service set (BSS). As shown in FIG. 1, in the WLAN, an access point (AP) and a plurality of non-AP stations (non-AP STA) associated with the AP constitute a basic service set. The parallel multi-user data transmission as mentioned in the WLAN generally refers that a plurality of secondary nodes simultaneously transmit data to a primary node, which is referred to as an uplink multi-user (UL MU), or that a primary node simultaneously transmits data to a plurality of secondary nodes, which are referred to as downlink multi-users (DL MU). Generally, the primary node is an AP or a non-AP STA with special ability, and the secondary node is a general non-AP STA.

In a WLAN system, data transmission generally is random access, and there is no strict synchronous relationship. Therefore, to allow a receiver to successfully detect and receive data in a radio frame, the WLAN radio frame generally includes a physical layer frame header and a data payload, where the physical layer frame header further includes a training sequence and a physical layer frame header signaling, as shown in FIG. 2. The above training sequence is used by the receiver to detect starting of the radio frame, and carry out operations such as synchronization, gain control, channel estimation and so on, to assist in receiving the physical layer frame header signaling and the data payload. The physical layer frame header signaling generally is transmitted using a fixed format and indicates a transmitted parameter of the data payload, for example, information such as a modulation and coding scheme and a bandwidth of the data payload. In conclusion, the physical layer frame header is a combination of the training sequence and the signaling domain, which is designed for assisting in receiving the data payload.

With the development of WLAN, new technologies are continuously introduced into the WLAN standard, and thus the format of the above WLAN radio frame is also continuously changed. For example, 802.11a/g adopts the orthogonal frequency division multiplexing (OFDM) technology. To receive the OFDM data payload, the physical layer frame header needs to assist the OFDM in receiving the required training sequence and the physical layer frame header signaling. This format is currently referred to as a non-high-throughput format (non-HT format). MIMO and a bandwidth of 40 MHz are also introduced into 802.11n. The format of the radio frame is modified to adapt to these changes. This format is currently referred to as a high-throughput format (HT format). Technologies such as more advanced MIMO, larger bandwidth, DL MU-MIMO and so on are introduced into 802.11ac. The format of the 802.11ac is currently referred to as a very-high-throughput format (VHT format). To increase the efficiency, technologies such as OFDMA multi-user transmission, narrower OFDM sub-carrier spacing and so on are also introduced into the new generation of WLAN, and thus the frame format thereof is also changed, which is tentatively referred to as a high-efficiency format (HE format) at present.

The WLAN radio frame format is in continuous development, and is characterized by: (1) backward compatibility, where a WLAN device can decode a frame format defined earlier than a standard supported by the WLAN device, for example, a VHT station can transmit and receive frames with VHT, HT and non-HT formats, but a non-HT station can neither transmit nor receive a frame with HT or VHT format; (2) the frame format is in continuous development, where the basic structure of a frame still includes the physical layer frame header and the data payload, the physical layer frame header is a combination of the training sequence and the signaling domain, which is designed for assisting in receiving the data payload closely following physical layer frame header; and (3) to allow more types of stations to decode a control frame or control information, generally it is suggested to transmit the control frame or the control information using the non-HT format to ensure that the control information may be detected by new and old devices, for example, channel resource reservation information is transmitted using the non-HT format, which may better protect the data transfer from interference.

FIG. 3 is a schematic diagram of an uplink multi-user transmission procedure in the prior art. In the prior art, a UL MU transmission procedure is started by an AP by transmitting a trigger frame including scheduling and signaling indication, and an uplink multi-user transmits the trigger frame according to the content of the trigger frame. In this way, the problem of interference and synchronization between uplink multi-users is solved. The scheduling and signaling indication contained in the above trigger frame specifically indicates the length of the data transmitted by the station, the transmitted parameter, and a location of resource for uplink transmission. In addition, to enable the trigger frame to play a role in reserving channel resources and protecting the uplink multi-user transmission, the trigger frame is transmitted using a traditional frame format (non-HT format) or a traditional modulation and coding scheme, so as to ensure that traditional devices and other listening devices also can parse the reservation information in the trigger frame.

However, following problems exist in the trigger frame with the traditional format. (1) If a new frame format (HE format) is adopted for data transmission of the uplink multi-user, to ensure the synchronization, the uplink multi-user needs to measure the trigger frame and transmit a multi-user radio frame with an uplink HE format according to a measurement result. However, if the trigger frame uses the traditional format instead of the HE format, the training signal carried in the traditional format is designed to receive the data payload with the traditional frame format, which may ensure successful reception of the trigger frame but is insufficient to meet the training precision required for the multi-user transmission. As shown in FIG. 3, the trigger frame with the traditional format only carries a traditional training signal. In this case, if the trigger frame adopts the HE format, although the training precision or training requirements may be satisfied, it is impossible for a traditional terminal to decode the trigger frame, and it is impossible to acquire the channel resource reservation information from the trigger frame, and thus the traditional terminal may likely interfere with transmission of an HE terminal. (2) Upon receiving the trigger frame, the uplink multi-user needs to immediately carry out uplink transmission after a particular interframe space (IFS), and thus may have no enough time for data preparation. As shown in FIG. 3, after a short interframe space (SIFS), the STA1~STA4 may likely be unable to prepare the uplink multi-user radio frame.

As can be seen from the above procedure, in the prior art, using a trigger frame is not able to complete transmission resources reservation and trigger multi-user transmission at the same time as satisfying the training accuracy required for uplink multi-user transmission, and it is impossible to ensure that a station will have enough time to prepare uplink data after receiving a trigger frame.

This section provides background information related to the present disclosure which is not necessarily prior art.

SUMMARY

To solve the above technical problem, embodiments of the present disclosure provide a wireless signal transmission method and system, which are used to solve the problems in the prior art that a trigger frame is not able to complete transmission resources reservation and trigger multi-user transmission at the same time as satisfying the training accuracy required for uplink multi-user transmission, and that it is impossible to ensure that a station will have enough time to prepare uplink data after receiving a trigger frame.

To achieve the above technical objective, an embodiment of the present disclosure provides a wireless signal transmission method. The method includes: transmitting, by a transmitting station, a wireless signal to one or more receiving stations, where the wireless signal includes a first portion and a second portion, the first portion being a trigger frame with a first type of frame format which can be independently decoded, the second portion being a specific signal with a second type of frame format; and receiving, by the transmitting station, a radio frame transmitted by at least one of the plurality of receiving stations.

The present disclosure also provides a wireless signal transmission method. The method includes: receiving, by a plurality of receiving stations, a wireless signal transmitted by a transmitting station, where the wireless signal includes a first portion and a second portion, the first portion being a trigger frame with a first type of frame format which can be independently decoded, the second portion being a specific signal with a second type of frame format; and transmitting, by at least one of the plurality of receiving stations, a radio frame to the transmitting station according to the received wireless signal.

An embodiment of the present disclosure also provides a wireless signal transmission system, which is applied to a transmitting station. The system includes: a transmitting module, configured to transmit a wireless signal to a plurality of receiving stations, where the wireless signal includes a first portion and a second portion, the first portion being a trigger frame with a first type of frame format which can be independently decoded, the second portion being a specific signal with a second type of frame format; and a receiving module, configured to receive a radio frame transmitted by at least one of the plurality of receiving stations.

The present disclosure also provides a wireless signal transmission system, which is applied to a receiving station. The system includes: a receiving module, configured to receive a wireless signal transmitted by a transmitting station, where the wireless signal includes a first portion and a second portion, the first portion being a trigger frame with a first type of frame format which can be independently decoded, the second portion being a specific signal with a second type of frame format; and a transmitting module, configured to transmit a radio frame to the transmitting station according to the received wireless signal.

The present disclosure also provides a transmitting station, including: a processor; and a memory configured to store instructions executable by the processor; wherein the processor is configured to perform: transmitting a wireless signal to one or more receiving stations, wherein the wireless signal comprises a first portion and a second portion, the first portion being a trigger frame with a first type of frame format which can be independently decoded, the second portion being a specific signal with a second type of frame format; and receiving a radio frame transmitted by at least one of the plurality of receiving stations.

The present disclosure also provides a receiving station, including: a processor; and a memory configured to store instructions executable by the processor; wherein the processor is configured to perform: receiving a wireless signal transmitted by a transmitting station, where the wireless signal includes a first portion and a second portion, the first portion being a trigger frame with a first type of frame format which can be independently decoded, the second portion being a specific signal with a second type of frame format; and transmitting a radio frame to the transmitting station according to the received wireless signal.

According to a still another embodiment of the present disclosure, there is further provided a storage medium. The storage medium is configured to store program codes for performing following steps:

transmitting a wireless signal to a plurality of receiving stations, where the wireless signal includes a first portion and a second portion, the first portion being a trigger frame with a first type of frame format which can be independently decoded, the second portion being a specific signal with a second type of frame format; and receiving a radio frame transmitted by at least one of the plurality of receiving stations.

In this embodiment of the present disclosure, a wireless signal is transmitted by a transmitting station to a plurality of receiving stations, where the wireless signal includes a first portion and a second portion, the first portion being a trigger frame with a first type of frame format which can be independently decoded, the second portion being a specific signal with a second type of frame format; and receiving, by the transmitting station, a radio frame transmitted by at least one of the plurality of receiving stations. Thus, through the present disclosure, the trigger frame with the traditional frame format of the first portion may be utilized to complete scheduling and triggering and transmission of channel reservation information, and protect the subsequent high-efficiency transmission. Furthermore, a specific spreading signal with a new format of the second portion may be utilized to make an accurate measurement and estimation to ensure synchronous high-efficiency transmission, and time required for data preparation may be increased for an uplink multi-user.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings described herein are intended for providing further understanding of the present disclosure, and constituting a part of the present disclosure. The exemplary embodiments of the present disclosure and description thereof are intended for explaining the present disclosure, but not for constituting an improper limitation on the present disclosure. In the drawings.

DETAILED DESCRIPTION

Embodiments of the present disclosure are described in detail with reference to the accompanying drawings. However, it should be appreciated that the embodiments described below are merely intended to describe and explain the present disclosure but not intended to limit the present disclosure.

Figure 1:
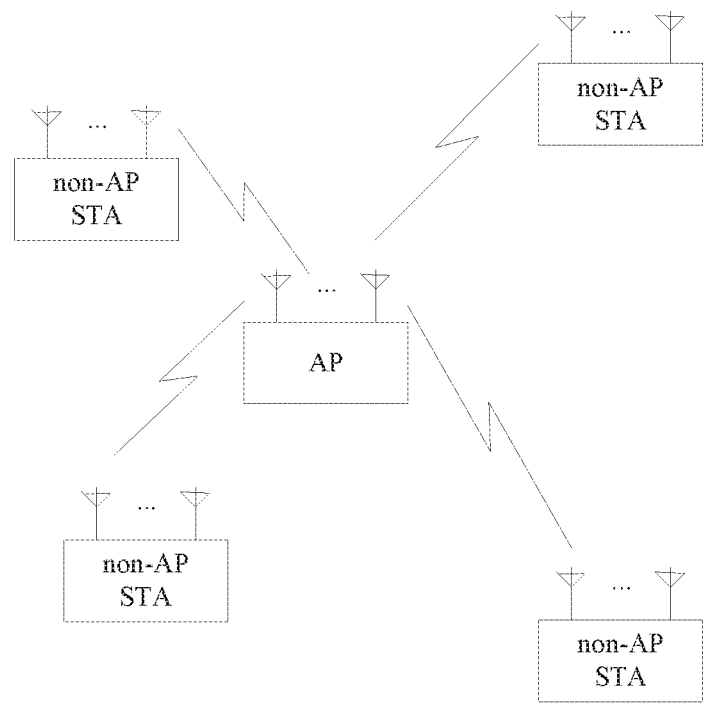
FIG. 1 is an exemplary diagram of a WLAN basic service set.
Figure 2:
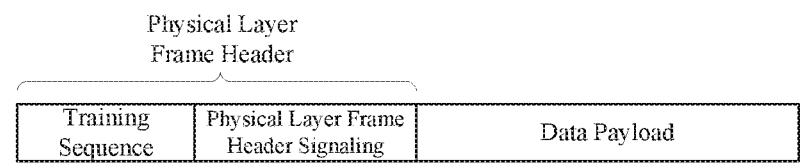
FIG. 2 is a schematic diagram of an existing WLAN radio frame structure.
Figure 3:
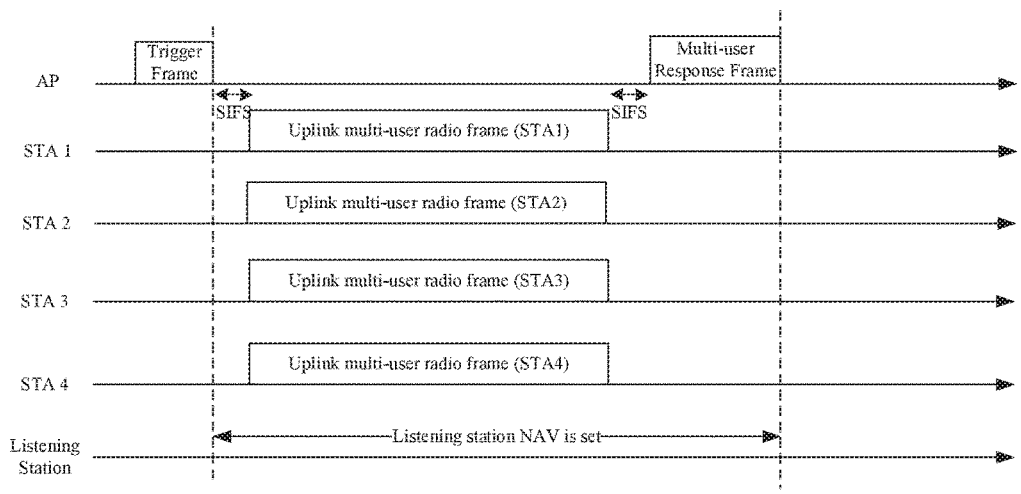
FIG. 3 is a schematic diagram of an uplink multi-user transmission procedure in the prior art.
Figure 4:
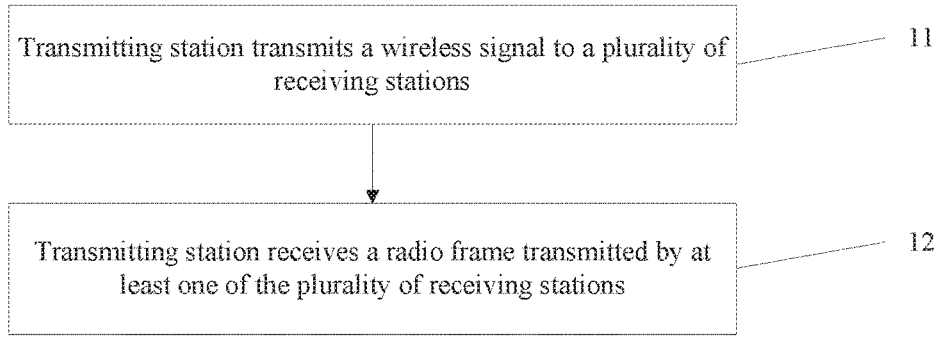
FIG. 4 is a flowchart of a wireless signal transmission method according to an embodiment of the present disclosure.

FIG. 4 is a flowchart of a wireless signal transmission method according to an embodiment of the present disclosure. As shown in FIG. 4, the wireless signal transmission method provided by this embodiment includes the following steps.

In Step 11, a transmitting station transmits a wireless signal to one or more receiving stations.

The wireless signal includes a first portion and a second portion, the first portion being a trigger frame with a first type of frame format which can be independently decoded, and the second portion being a specific signal with a second type of frame format. Specifically, the trigger frame includes a physical layer frame header with the first type of frame format and a data payload with the first type of frame format. The physical layer frame header with the first type of frame format is configured to assist the receiving station in receiving the data payload with the first type of frame format, where the data payload with the first type of frame format is configured to trigger the receiving station to transmit the radio frame to the transmitting station. The specific signal with the second type of frame format is used for assisting the receiving station in preparing the radio frame to be transmitted to the transmitting station.

The first portion is capable of independently decoding, which refers that decoding contents of the trigger frame does not need to rely on the specific signal with the second type of frame format.

The first type of frame format includes a non-high-throughput (non-HT) format or a modulation and coding scheme the same as the non-HT format; and the second type of frame format includes a high-efficiency (HE) format.

In an embodiment, the specific signal with the second type of frame format is a training signal or spreading signal or supplementary signal with the second type of frame format. The training signal includes one or more training sequences; and no interframe space exists between the trigger frame and the training signal or the spreading signal or the supplementary signal.

In an embodiment, the specific signal with the second type of frame format is a null data packet (NDP) including a training signal or spreading signal with the second type of frame format, where the training signal includes one or more training sequences; and a space between the NDP and the trigger frame is a short interframe space (SIFS).

In an embodiment, a physical layer frame header of the trigger frame includes indication information of a transmission duration of the trigger frame.

In an embodiment, a media access control (MAC) layer frame header of the trigger frame includes a transmission duration of the specific signal with the second type of frame format, a duration of one or more radio frames transmitted by the receiving station, a duration of one or more response frames transmitted by the transmitting station, and indication information of interframe space duration thereamong.

In an embodiment, a media access control (MAC) layer frame header of the trigger frame includes indication information of a frame type and/or subframe type. The frame type and/or subframe type is used for indicating that the trigger frame is configured to trigger the plurality of receiving stations to transmit the radio frame, and the specific signal with the second type of frame format is provided after the trigger frame.

In an embodiment, a condition of deciding that the specific signal with the second type of frame format is provided after the trigger frame includes: the frame type of the trigger frame and the indication information or a sequence in the trigger frame implying that the specific signal with the second type of frame format is provided after the trigger frame; and the indication information or the sequence in the trigger frame further implying that the specific signal includes at least one of: a length and a format.

In an embodiment, the trigger frame includes at least one of following indication information of a training signal with the second type of frame format:

indication information indicating whether or not carrying the training signal with the second type of frame format;

indication information of transmission duration or the number of training sequences of the training signal with the second type of frame format; and indication information of a transmitted parameter of the training signal with the second type of frame format.

The transmitted parameter includes, for example, a symbol period, a guard interval (GI) type, and a transmission channel bandwidth.

In Step 12, the transmitting station receives a radio frame transmitted by at least one of the plurality of receiving stations.

Figure 5:
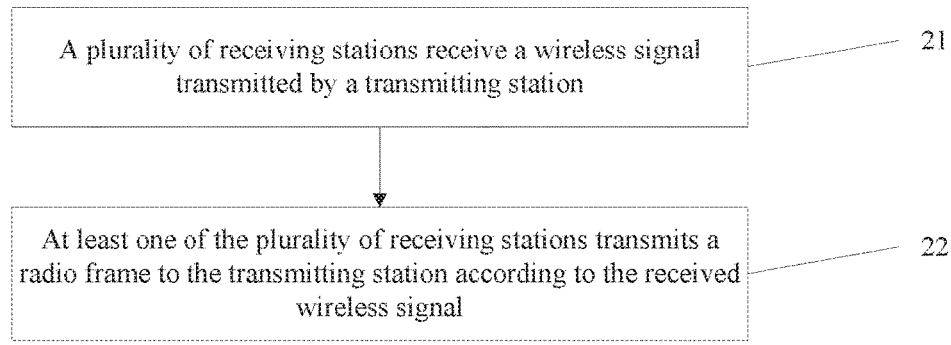
FIG. 5 is a flowchart of a wireless signal transmission method according to an embodiment of the present disclosure.

FIG. 5 is a flowchart of a wireless signal transmission method according to an embodiment of the present disclosure. As shown in FIG. 5, the wireless signal transmission method provided by this embodiment includes the following steps.

In Step 21, a plurality of receiving stations receive a wireless signal transmitted by a transmitting station.

The wireless signal includes a first portion and a second portion, the first portion being a trigger frame with a first type of frame format which can be independently decoded, and the second portion being a specific signal with a second type of frame format.

Specifically, the trigger frame includes a physical layer frame header with the first type of frame format and a data payload with the first type of frame format. The physical layer frame header with the first type of frame format is configured to assist the receiving station in receiving the data payload with the first type of frame format, where the data payload with the first type of frame format is configured to trigger the receiving station to transmit the radio frame to the transmitting station. The specific signal with the second type of frame format is used for assisting the receiving station in preparing the radio frame to be transmitted to the transmitting station.

The first type of frame format includes a non-high-throughput (non-HT) format or a modulation and coding scheme the same as the non-HT format; and the second type of frame format includes a high-efficiency (HE) format.

In an embodiment, the specific signal with the second type of frame format is a training signal or spreading signal with the second type of frame format, where the training signal includes one or more training sequences; and no interframe space exists between the trigger frame and the training signal or the spreading signal.

In an embodiment, the specific signal with the second type of frame format is a null data packet (NDP) including a training signal or spreading signal with the second type of frame format, where the training signal includes one or more training sequences; and a space between the NDP and the trigger frame is a short interframe space (SIFS).

In an embodiment, a physical layer frame header of the trigger frame includes indication information of a transmission duration of the trigger frame.

In an embodiment, a media access control (MAC) layer frame header of the trigger frame includes a transmission duration of the specific signal with the second type of frame format, a duration of one or more radio frames transmitted by the receiving station, a duration of one or more response frames transmitted by the transmitting station, and indication information of interframe space duration thereamong.

In an embodiment, a media access control (MAC) layer frame header of the trigger frame includes indication information of a frame type and/or subframe type. The frame type and/or subframe type is used for indicating that the trigger frame is configured to trigger the plurality of receiving stations to transmit the radio frame, and the specific signal with the second type of frame format is provided after the trigger frame.

In an embodiment, the trigger frame includes at least one of following indication information of a training signal with the second type of frame format:

indication information indicating whether or not carrying the training signal with the second type of frame format;

indication information of transmission duration or the number of training sequences of the training signal with the second type of frame format; and indication information of a transmitted parameter of the training signal with the second type of frame format.

The transmitted parameter includes, for example, a symbol period, a guard interval (GI), and a transmission channel bandwidth.

In Step 22, at least one of the plurality of receiving stations transmits a radio frame to the transmitting station according to the received wireless signal.

In an embodiment, the Step 22 includes: after finishing parsing the trigger frame, preparing, by the receiving station, a radio frame to be transmitted to the transmitting station, and transmitting, by the receiving station, the radio frame after a short interframe space (SIFS) duration upon completion of the specific signal with the second type of frame format.

In an embodiment, the Step 22 includes: measuring, by the receiving station, one or more training sequences included in the training signal with the second type of frame format, and estimating, by the receiving station, one of following information:

an adjustment parameter of the to-be-transmitted radio frame;

channel state information; and channel busy/idle information.

The adjustment parameter includes at least one of: a frequency offset adjustment amount, a transmission power adjustment amount, and a transmission time delay adjustment amount.

In an embodiment, the Step 22 includes: estimating, by the receiving station, channel busy/idle information according to the received wireless signal in at least one of the following ways:

estimating the channel busy/idle information by measuring the specific signal with the second type of frame format;

estimating the channel busy/idle information by detecting within interframe space time after the specific signal with the second type of frame format; and estimating the channel busy/idle information by detecting within interframe space time before the specific signal with the second type of frame format.

The manner of detecting within interframe space time after the specific signal with the second type of frame format or the manner of detecting within interframe space time before the specific signal with the second type of frame format includes: clear channel assessment (CCA), mid-packet detection, and energy detection.

In the following, the present disclosure is described in detail with reference to embodiments.

Embodiment I

An access point (AP) supporting uplink multi-user transmission establishes a basic service set (BSS), and an associated authentication procedure is performed between a plurality of non-AP STAs and the AP to constitute a BSS. In the above associated procedure, the AP interacts capability information with each station, including an indication whether or not supporting uplink multi-user transmission capability. In this embodiment, supposing the associated stations STA1~4 support the uplink multi-user data transmission.

Figure 6:
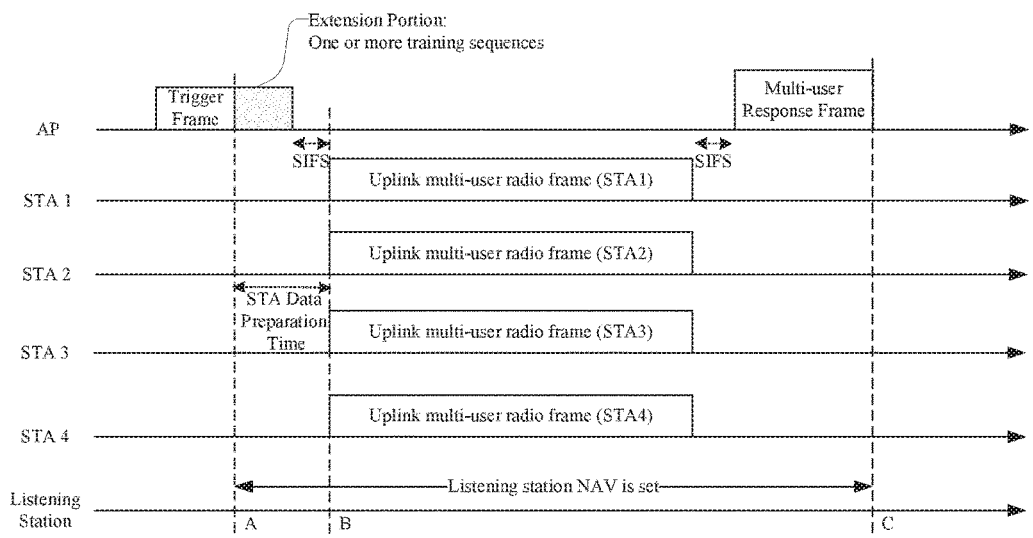
FIG. 6 is a schematic diagram of a wireless signal transmission method according to Embodiment I of the present disclosure being used for uplink multi-user transmission.
Figure 7:
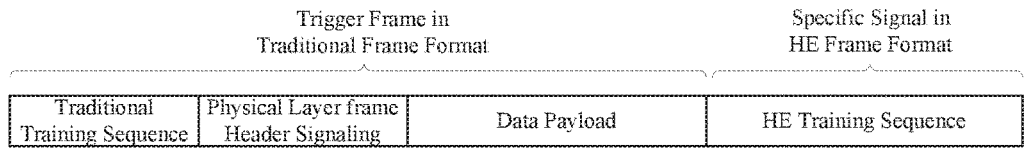
FIG. 7 is a schematic diagram of an extended frame structure according to Embodiment I of the present disclosure.

FIG. 6 is a schematic diagram of a wireless signal transmission method according to Embodiment I of the present disclosure being used for uplink multi-user transmission. FIG. 7 is a schematic diagram of an extended frame structure according to Embodiment I of the present disclosure. In this embodiment, an uplink multi-user transmission uses the trigger frame with the traditional frame format and the training signal with the HE format of the second portion. In a transmission opportunity (TXOP), the AP transmits a trigger frame with a traditional format (i.e., the non-HT format) and transmits a subsequent training signal with the HE format (including one or more training sequence domains). The training domain may be a short training domain or long training domain with the HE format and the above combination. The trigger frame indicates to schedule STA1, STA2, STA3 and STA4 to carry out uplink parallel transmission, and indicates a resource and a transmitted parameter of each user for uplink multi-user transmission.

The STA1~STA4 detect the trigger frame and the training signal with the HE format of the second portion transmitted by the AP. Taking the STA1 as an example, the processing procedures thereof are as below: when it is detected that the format of the trigger frame is a traditional frame format, the STA1 receives the trigger frame according to the traditional frame format, and discovers that the STA1 is scheduled to carry out uplink multi-user transmission according to the indication information in the trigger frame, where the trigger frame includes the uplink resource of the STA1 and the indication information of the transmitted parameter such as the transmission duration and the guard interval, etc. Upon receiving the trigger frame, the STA1 starts to prepare uplink transmission data, namely, starting from Point A in FIG. 6, the physical layer of the STA1 delivers the decoded trigger frame to the media access control (MAC) layer of the STA1. The MAC layer of the STA1 starts to prepare an uplink data packet according to the indication information of the trigger frame. In addition, the trigger frame implicitly or explicitly indicates that when the training signal with the HE format of the second portion is also provided after the trigger frame, the STA1 (mainly the physical layer) continues to detect the training signal of the second portion, to more accurately estimate the adjustment parameter such as the frequency offset between the STA1 and the AP, such that the STA1 adjusts the frequency offset of the radio frame transmitted by the STA1 during the uplink multi-user transmission, thereby ensuring that STA1 is aligned with the AP in frequency offset as much as possible. In this way, by transmitting the training signal with the HE format of the second portion, time required for preparing the uplink data may be increased for a station in the uplink multi-user. As shown in FIG. 6, the preparation time is equal to the time for transmitting the signal of the second portion plus SIFS time (some processing delay may likely be minus). Furthermore, it may be ensured that the STA1 accurately measures the frequency offset between a local crystal oscillator and an AP crystal oscillator according to the signal with the HE format of the second portion. The STA1 may use these measurement results to adjust the frequency offset amount of the STA1, thus ensuring orthogonal uplink multi-user transmission as much as possible without mutual interference.

The AP receives multi-user radio frames transmitted by the STA1~STA4 and transmits a feedback frame, a frame type or format thereof being set as a block acknowledgement frame (abbreviated as MU_BA) used for multi-user data acknowledgement and paging. This block acknowledgement frame includes acknowledgement information of data in the multi-user radio frames transmitted by each station in the STA1~STA4.

The physical layer frame header in the trigger frame includes indication information of transmission duration of the trigger frame. For example, a signaling domain SIG in the physical layer frame header is used to indicate parameters of length and rate of transmitted data, thereby determining the transmission duration of the trigger frame. The trigger frame transmission duration information indicated in the physical layer frame header signaling includes the transmission duration of the trigger frame, but does not include the transmission duration of a specific signal with the HE frame format of the second portion, such that it is ensured all receiving stations (including traditional stations) can accurately parse end of the trigger frame. In addition, the MAC frame header of the trigger frame includes duration information. The duration value is used for reserving channel time to prevent stations other than the stations STA1~STA4 from accessing the channel. Specifically, because the trigger frame uses the traditional frame format, no matter a new device or a traditional 802.11a/g/n/ac station can parse the duration value and set a local network allocation vector (NAV) to avoid interference with the uplink multi-user transmission. The duration indicated by the duration value includes the transmission duration of the training signal with the HE frame format of the second portion, the duration of the uplink radio frame transmitted by the STAT~STA4, the duration of the acknowledgement frame (MU-BA) transmitted by the AP, and the interframe space duration thereamong.

Embodiment II

In this embodiment, an uplink multi-user transmission uses the trigger frame with the traditional frame format and a spreading signal with the HE format of the second portion. Specifically, in a transmission opportunity (TXOP), the AP transmits a trigger frame with a traditional format (i.e., the non-HT format) and transmits a subsequent spreading signal with the HE format, where the spreading signal may be a special sequence with the HE format. The special sequence with the HE format is a special information bit sequence predefined by an HE-related protocol. For example, the special sequence may be an all-1 sequence. The trigger frame indicates to schedule STA1, STA2, STA3 and STA4 to carry out uplink parallel transmission, and indicates a resource and a transmitted parameter of each user for uplink multi-user transmission.

The STA1~STA4 detect the trigger frame and the spreading signal with the HE format of the second portion transmitted by the AP. Taking the STA1 as an example, the processing procedures thereof are as below: when it is detected that the format of the trigger frame is a traditional frame format, the STA1 receives the trigger frame according to the traditional frame format, and discovers that the STA1 is scheduled to carry out uplink multi-user transmission according to the indication information in the trigger frame, where the trigger frame includes the uplink resource of the STA1 and the indication information of the transmitted parameter such as the transmission duration and the guard interval, etc. Upon receiving the trigger frame, the STA1 starts to prepare uplink transmission data, namely, the physical layer of the STA1 delivers the decoded trigger frame to the media access control (MAC) layer of the STA1, and the MAC layer of the STA1 starts to prepare an uplink data packet according to the indication information of the trigger frame. In addition, the trigger frame implicitly or explicitly indicates that when the spreading signal with the HE format of the second portion is also provided after the trigger frame, the STA1 does not detect the spreading signal of the second portion, but only after the SIFS duration upon completion of transmission of the signal of the second portion can the STA1 transmit the uplink data. At this moment, the STA1 uses a traditional signaling domain included in the traditional trigger frame to estimate an adjustment parameter such as the frequency offset between the STA1 and the AP, such that the STA1 adjusts the frequency offset of the radio frame transmitted by the STA1 during the uplink multi-user transmission, thereby ensuring that STA1 is aligned with the AP in frequency offset as much as possible. By transmitting the spreading signal with the HE format of the second portion, time required for preparing the uplink data may be increased for stations (STA1~STA4) in the uplink multi-user, and the preparation time is equal to the time for transmitting the spreading signal of the second portion plus SIFS duration (some processing delay may likely be minus). Furthermore, the STA1~STA4 do not process the spreading signal with the HE format of the second portion, which may relieve burden and simplify receiving process.

The AP receives multi-user radio frames transmitted by the STA1~STA4 and transmits a feedback frame, a frame type or format thereof being set as a block acknowledgement frame (abbreviated as MU_BA) used for multi-user data acknowledgement and paging. This block acknowledgement frame includes acknowledgement information of data in the multi-user radio frames transmitted by each station in the STA1~STA4.

The physical layer frame header in the trigger frame includes indication information of transmission duration of the trigger frame. For example, a signaling domain SIG in the physical layer frame header is used to indicate parameters of length and rate of transmitted data, thereby determining the transmission duration of the trigger frame. The trigger frame transmission duration information indicated in the physical layer frame header signaling includes the transmission duration of the trigger frame, but does not include the transmission duration of the spreading signal with the HE frame format of the second portion, such that it is ensured all receiving stations (including traditional stations) can accurately parse end of the trigger frame. In addition, the MAC frame header of the trigger frame includes duration information. The duration value is used for reserving channel time to prevent stations other than the stations STA1~STA4 from accessing the channel. Specifically, because the trigger frame uses the traditional frame format, no matter a new device or a traditional 802.11a/g/n/ac station can parse the duration value and set a local network allocation vector (NAV) to avoid interference with the uplink multi-user transmission. The duration indicated by the duration value includes the transmission duration of the spreading signal with the HE frame format of the second portion, the duration of the uplink radio frame transmitted by the STA1~STA4, the duration of the acknowledgement frame (MU-BA) transmitted by the AP, and the interframe space duration thereamong.

Embodiment III

Figure 8:
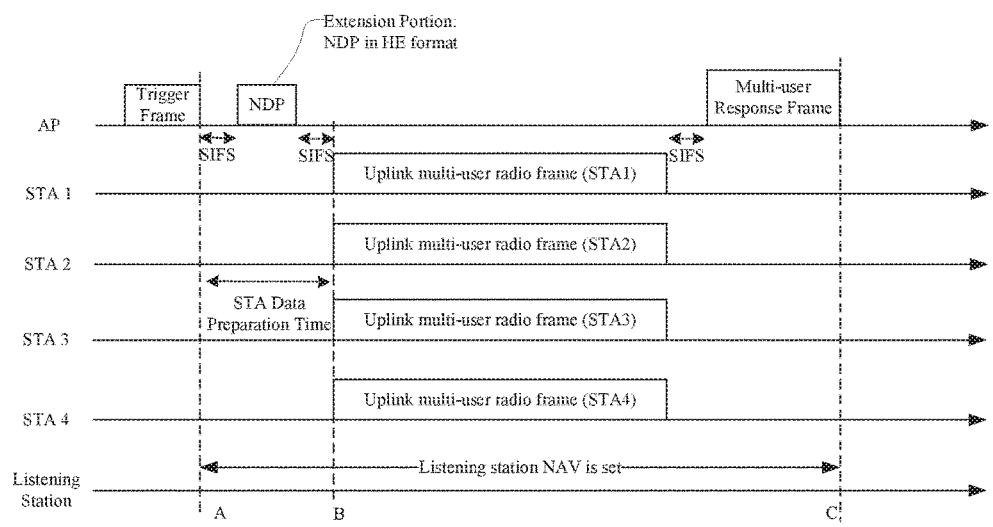
FIG. 8 is a schematic diagram of a wireless signal transmission method according to Embodiment III of the present disclosure being used for uplink multi-user transmission.

FIG. 8 is a schematic diagram of a wireless signal transmission method according to Embodiment III of the present disclosure being used for uplink multi-user transmission. In this embodiment, an uplink multi-user transmission uses the trigger frame with the traditional frame format and the null data packet (NDP) with the HE format of the second portion. In a transmission opportunity (TXOP), the AP transmits a trigger frame with a traditional format (i.e., the non-HT format) and transmits the NDP with the HE format after the SIFS duration. The NDP includes a short training domain or long training domain with the HE format and the above combination. The trigger frame includes indication information for scheduling STA1, STA2, STA3 and STA4 to carry out uplink parallel transmission, and indication information indicating a resource and a transmitted parameter of each user for uplink multi-user transmission.

The STAT~STA4 detect the trigger frame transmitted by the AP. Taking the STA1 as an example, the processing procedures thereof are as below: when it is detected that the format of the trigger frame is a traditional frame format, the STA1 receives the trigger frame according to the traditional frame format, and discovers that the STA1 is scheduled to carry out uplink multi-user transmission according to the indication information in the trigger frame, where the trigger frame includes the uplink resource of the STA1 and the indication information of the transmitted parameter such as the transmission duration and the guard interval, etc. Upon receiving the trigger frame, the STA1 starts to prepare uplink transmission data, namely, starting from Point A in FIG. 8, the physical layer of the STA1 delivers the decoded trigger frame to the media access control (MAC) layer of the STA1. The MAC layer of the STA1 starts to prepare an uplink data packet according to the indication information of the trigger frame. In addition, the trigger frame implicitly or explicitly indicates that when the NDP with the HE format is also provided after the trigger frame, the STA1 (mainly the physical layer) continues to detect the NDP of the second portion, to more accurately estimate the adjustment parameter such as the frequency offset between the STA1 and the AP, such that the STA1 adjusts the frequency offset of the radio frame transmitted by the STA1 during the uplink multi-user transmission, thereby ensuring that STA1 is aligned with the AP in frequency offset as much as possible. In this way, by transmitting the NDP with the HE format of the second portion, time required for preparing the uplink data may be increased for a station in the uplink multi-user. As shown in FIG. 8, the preparation time is equal to the time for transmitting the NDP plus two SIFS durations (some processing delay may likely be minus). Furthermore, it may be ensured that the STA1 accurately measures the frequency offset between a local crystal oscillator and an AP crystal oscillator according to the NDP with the HE format. The STA1 may use these measurement results to adjust the frequency offset amount of the STA1, thus ensuring orthogonal uplink multi-user transmission as much as possible without mutual interference.

The AP receives multi-user radio frames transmitted by the STA1~STA4 and transmits a feedback frame, a frame type or format thereof being set as a block acknowledgement frame (abbreviated as MU_BA) used for multi-user data acknowledgement and paging. This block acknowledgement frame includes acknowledgement information of data in the multi-user radio frames transmitted by each station in the STAT~STA4.

The physical layer frame header in the trigger frame includes indication information of transmission duration of the trigger frame. For example, a signaling domain SIG in the physical layer frame header is used to indicate parameters of length and rate of transmitted data, thereby determining the transmission duration of the trigger frame. The trigger frame transmission duration information indicated in the physical layer frame header signaling includes the transmission duration of the trigger frame, such that it is ensured all receiving stations (including traditional stations) can accurately parse end of the trigger frame. In addition, the MAC frame header of the trigger frame includes duration information. The duration value is used for reserving channel time to prevent stations other than the stations STA1~STA4 from accessing the channel Specifically, because the trigger frame uses the traditional frame format, no matter a new device or a traditional 802.11a/g/n/ac station can parse the duration value and set a local network allocation vector (NAV) to avoid interference with the uplink multi-user transmission. The duration indicated by the duration value includes the transmission duration of the NDP with the HE frame format, the duration of the uplink radio frame transmitted by the STAT~STA4, the duration of the acknowledgement frame (MU-BA) transmitted by the AP, and the interframe space duration thereamong.

Embodiment IV

In this embodiment, an uplink multi-user transmission uses a physical layer signaling trigger frame with the modulation and coding scheme the same as the non-HT format and a specific signal with the HE format of the second portion. Specifically, in a transmission opportunity (TXOP), the AP transmits a trigger frame with a physical layer signaling format the same as the non-HT format and transmits a subsequent specific signal with the HE format. The trigger frame with a physical layer signaling format the same as the non-HT format refers to a physical layer signaling domain defined by a new technology, namely, the trigger frame may use a newly-defined format. However, the signaling domain still uses the traditional modulation and coding scheme, and a signal thereof is not subject to spatial processing such as beamforming. The trigger frame includes indication information for scheduling STA1, STA2, STA3 and STA4 to carry out uplink parallel transmission, and indication information indicating a resource and a transmitted parameter of each user for uplink multi-user transmission.

The STA1~STA4 detect the trigger frame and the specific signal with the HE format of the second portion transmitted by the AP. Taking the STA1 as an example, the processing procedures thereof are as below: the trigger frame is detected, and it is discovered that the STA1 is scheduled to carry out uplink multi-user transmission according to the indication information in the trigger frame, where the trigger frame includes the uplink resource of the STA1 and the indication information of the transmitted parameter such as the transmission duration and the guard interval, etc. Upon receiving the physical layer signaling including the trigger frame information, the STA1 starts to prepare uplink transmission data, namely, the physical layer of the STA1 delivers the decoded trigger frame information to the media access control (MAC) layer of the STA1, and the MAC layer of the STA1 starts to prepare an uplink data packet according to the indication information of the trigger frame. In addition, the trigger frame implicitly or explicitly indicates that when the specific signal with the HE format of the second portion is also provided after the physical layer signaling domain, the STA1 detects the specific signal of the second portion, and estimates the adjustment parameter such as the frequency offset between the STA1 and the AP according to the specific signal, such that the STA1 adjusts the frequency offset of the radio frame transmitted by the STA1 during the uplink multi-user transmission, thereby ensuring that STA1 is aligned with the AP in frequency offset as much as possible.

The AP receives multi-user radio frames transmitted by the STA1~STA4 and transmits a feedback frame, a frame type or format thereof being set as a block acknowledgement frame (abbreviated as MU_BA) used for multi-user data acknowledgement and paging. This block acknowledgement frame includes acknowledgement information of data in the multi-user radio frames transmitted by each station in the STAT~STA4.

In addition, the trigger frame also may be transmitted using other newly-defined formats. In the present disclosure, it is not limited that the trigger frame must be transmitted using a non-HT format. Instead, the trigger frame also may be transmitted using, for example, the HE format.

Embodiment V

In this embodiment, the station may perform a channel estimation according to the specific signal with the second type of frame format posterior to the received trigger frame.

The AP transmits the trigger frame with the traditional format (i.e., the non-HT format) and transmits a subsequent training signal with the HE format (including a training sequence domain) or an NDP including the training signal with the HE format (including a training sequence domain). The training domain may be a short training domain or long training domain with the HE format and the above combination. Any station (no matter the destination stations such as the STA1~STA4 or other listening stations) having received a training domain with the HE format transmitted by the AP may detect the training domain, where the training domain with the HE format is determined as a sounding signal.

Taking the STA1 as an example, the processing procedures thereof are as below: after the trigger frame is received, the trigger frame implicitly or explicitly indicates that when the training signal with the HE format of the second portion or an NDP including the training signal with the HE format is also provided after the trigger frame, the STA1 (mainly the physical layer) continues to detect the training sequence domain of the second portion, estimates channel information between the AP and the STA1, and may generate a corresponding measurement report.

Embodiment VI

In this embodiment, the station may decide the channel busy/idle information according to the specific signal with the second type of frame format posterior to the received trigger frame.

The AP transmits a trigger frame with a traditional format (i.e., the non-HT format) and transmits a subsequent specific signal with the HE format. For example, the specific signal may be a short training domain or long training domain with the HE format, or the above combination, or other wireless signal determined by the receiving station. After having received the trigger frame, destination receiving stations of the trigger frame decide they are scheduled by the AP to carry out uplink radio frame transmission. These stations continue to detect the subsequent specific signal with the second type of frame format, decide quality of receiving the specific signal with the second type of frame format on the uplink resource scheduled by the station, decide whether the channel is available, namely decide whether the channel is idle, and then decide whether to respond to the schedule of the AP to transmit the uplink radio frame.

Taking the AP, the STA1 and the STA2 as examples, procedures thereof are as below: the AP transmits a trigger frame, where the trigger frame schedules the STA1 to carry out uplink transmission on a channel 1 and schedules the STA2 to transmit on a channel 2. After transmitting the trigger frame, the AP continues to transmit the specific signal.

After receiving the trigger frame, the STA1 discovers that the trigger frame schedules the STA1 to carry out uplink transmission on the channel 1. In this case, the STA1 (mainly the physical layer) continues to detect the specific signal of the second portion. By detecting the specific signal on the channel 1 or the quality of receiving the specific signal, it is decided whether the channel 1 is occupied or interfered severely. Supposing the STA1 detects that the specific signal of the second portion on the channel 1 is tinily interfered, it is regarded that the channel 1 is idle. In this case, the STA1 may transmit, on the channel 1, the radio frame to the AP.

Likewise, the STA2 also has a similar operation. Upon receiving the trigger frame, the STA2 detects the quality of the specific signal on the channel 2. Supposing the specific signal of the second portion on the channel 2 is severely interfered, it is regarded that the channel 2 is busy and thus does not respond to scheduling by the AP.

Embodiment VII

In this embodiment, the station may estimate the channel busy/idle information according to the received trigger frame and interframe space after the specific signal with the second type of frame format.

The AP transmits a trigger frame with a traditional format (i.e., the non-HT format) and transmits a subsequent specific signal with the HE format. For example, the specific signal may be a spreading signal with the HE format, or other wireless signal determined by the receiving station. After having received the trigger frame, destination receiving stations of the trigger frame may decode the trigger frame within the time when the spreading signal is transmitted. Uplink data are prepared if the stations are determined as the destination stations, and these stations may continue to detect the SIFS posterior to the specific signal with the second type of frame format or other IFS, decide whether the uplink resources used by these stations are being transmitted by other stations, namely decide whether the channel is available, and then decide whether to respond to the schedule of the AP to transmit the uplink radio frame.

Taking the AP, the STA1 and the STA2 as examples, procedures thereof are as below: the AP transmits a trigger frame, where the trigger frame schedules the STA1 to carry out uplink transmission on a channel 1 and schedules the STA2 to transmit on a channel 2. After transmitting the trigger frame, the AP continues to transmit the spreading signal.

After receiving the trigger frame, the STA1 discovers that the trigger frame schedules the STA1 to carry out uplink transmission on the channel 1. In this case, the STA1 (mainly the physical layer) continues to detect the SIFS after the specific signal of the second portion. The detection methods may include: clear channel assessment (CCA) detection, mid-packet detection within specific time (Mid-CCATime) or energy detection. Supposing the STA1 detects that no signal of other stations is detected within the SIFS after the specific signal of the second portion on the channel 1, it is regarded that the channel 1 is idle. In this case, the STA1 may transmit, on the channel 1, the radio frame to the AP.

Likewise, the STA2 also has a similar operation. Supposing signal energy of other stations is detected within the SIFS after the specific signal of the second portion on the channel 2, the STA2 regards that the channel 2 is busy, and thus does not respond to scheduling by the AP.

It is to be noted that when an IFS exists between the trigger frame and the specific signal with the second type of frame format, the receiving station also may use the IFS to detect channel idle information. Furthermore, the receiving station also may determine the channel busy/idle information using the detection method in Embodiment VI in conjunction with the detection method in this embodiment.

Embodiment VIII

In this embodiment, the AP transmits a trigger frame to carry out uplink multi-user transmission, where the trigger frame includes implicit or explicit indication information of the specific signal with the HE format of the second portion after the trigger frame. Hereupon, a specific indication method may include:

Implicit Indication:

The frame type of the trigger frame decides that a specific signal with the second type of frame format may be further transmitted after the trigger frame is transmitted. For example, an MAC frame header of the trigger frame includes indication information of a frame type and/or subframe type. The frame type and/or subframe type is used for indicating that the trigger frame is configured to trigger a plurality of receiving stations to transmit the radio frame, and the specific signal with the second type of frame format is provided after the trigger frame. That is, the specific signal protocol standard makes a predetermination or a related reservation in advance.

A particular combination of some other indication information in the trigger frame or a special sequence indication implicitly indicates that a specific signal with the second type of frame format is provided after the frame. In addition, information such as the length and format of the specific signal may be further implicitly indicated if required. Further, the indication length and format are also implicitly indicated by the above frame type and subframe type or a particular combination of some other indication information or a special sequence indication. For example, when the frame type is a trigger frame, by default the length of the specific signal is a fixed length value. For another example, the format of the specific signal is implicitly indicated, and the format of the trigger frame may implicitly indicate the format of the specific signal. When the format of the trigger frame is the non-HT format, the format of the specific signal is a bit sequence of specific information; and when the format of the trigger frame is the HE format, the format of the specific signal is a spreading signal with a specific format.

Explicit Indication:

When the trigger frame is transmitted using the traditional frame format, the MAC layer frame header or payload of the trigger frame explicitly includes at least one of following indication information of a training signal with the second type of frame format:

(1) indication information indicating whether or not carrying the training signal with the second type of frame format;

(2) indication information of transmission duration or the number of training sequences of the training signal with the second type of frame format; and (3) indication information of a transmitted parameter of the training signal with the second type of frame format, where the transmitted parameter specifically includes: a symbol period, a guard interval (GI) type, and a transmission channel bandwidth.

Alternatively, a physical layer signaling domain using a traditional modulation and coding scheme in a trigger frame explicitly includes at least one of following indication information of the training signal with the second type of frame format:

(1) indication information indicating whether or not carrying the training signal with the second type of frame format;

(2) indication information of transmission duration or the number of training sequences of the training signal with the second type of frame format; and (3) indication information of a transmitted parameter of the training signal with the second type of frame format, where the transmitted parameter specifically includes: a symbol period, a guard interval type, and a transmission channel bandwidth.

In addition, an embodiment of the present disclosure also provides a wireless signal transmission system, which is applied to a transmitting station. The system includes: a transmitting module, configured to transmit a wireless signal to a plurality of receiving stations, where the wireless signal includes a first portion and a second portion, the first portion being a trigger frame with a first type of frame format which can be independently decoded, the second portion being a specific signal with a second type of frame format; and a receiving module, configured to receive a radio frame transmitted by at least one of the plurality of receiving stations.

The first type of frame format includes a non-HT format or a modulation and coding scheme the same as the non-HT format; and the second type of frame format includes a high-efficiency (HE) format.

In an embodiment, the specific signal with the second type of frame format is a training signal or spreading signal with the second type of frame format. The training signal includes one or more training sequences; and no interframe space exists between the trigger frame and the training signal or the spreading signal.

In an embodiment, the specific signal with the second type of frame format is a null data packet (NDP) including a training signal or spreading signal with the second type of frame format. The training signal includes one or more training sequences; and a space between the NDP and the trigger frame is a short interframe space (SIFS).

In addition, specific processing procedures with regard to the above system are the same as the method in FIG. 4, and thus are not unnecessarily described herein.

Furthermore, an embodiment of the present disclosure also provides a wireless signal transmission system, which is applied to a receiving station. The system includes: a receiving module, configured to receive a wireless signal transmitted by a transmitting station, where the wireless signal includes a first portion and a second portion, the first portion being a trigger frame with a first type of frame format which can be independently decoded, the second portion being a specific signal with a second type of frame format; and a transmitting module, configured to transmit a radio frame to the transmitting station according to the received wireless signal.

In an embodiment, the specific signal with the second type of frame format is a training signal or spreading signal with the second type of frame format. The training signal includes one or more training sequences; and no interframe space exists between the trigger frame and the training signal or the spreading signal.

In an embodiment, the specific signal with the second type of frame format is a null data packet (NDP) including a training signal or spreading signal with the second type of frame format. The training signal includes one or more training sequences; and a space between the NDP and the trigger frame is a short interframe space (SIFS).

In an embodiment, the system further includes a module for receiving measurement and estimation, configured to measure one or more training sequences included in the training signal with the second type of frame format, and estimate one of following information:

an adjustment parameter of the to-be-transmitted radio frame;

channel state information; and channel busy/idle information.

In an embodiment, the system further includes a data preparation module, configured to start to prepare, after the receiving station finishes parsing the trigger frame, a radio frame to be transmitted to the transmitting station, and finish the preparation before transmitting the radio frame prior to arrival of a short interframe space (SIFS) duration upon completion of the specific signal with the second type of frame format.

In addition, specific processing procedures with regard to the above system are the same as the method in FIG. 5, and thus are not unnecessarily described herein.

An embodiment of the present disclosure further provides a storage medium. Alternatively, in this embodiment, the foregoing storage medium may be configured to store program codes for performing following steps:

S1: transmitting a wireless signal to a plurality of receiving stations, where the wireless signal includes a first portion and a second portion, the first portion being a trigger frame with a first type of frame format which can be independently decoded, the second portion being a specific signal with a second type of frame format; and S2: receiving a radio frame transmitted by at least one of the plurality of receiving stations.

Alternatively, in this embodiment, the above storage medium may include but is not limited to: a USB flash disk, a read-only memory (ROM), a random access memory (RAM), a mobile hard disk, a magnetic disk or an optical disk and other media that may store program codes.

Alternatively, reference may be made to examples as recited in the above embodiments and alternative embodiments for specific examples in this embodiment, which is not repeated any more herein.

Apparently, those skilled in the art should understand each of the foregoing modules or steps of the present disclosure may be realized with general computing devices, they may be concentrated on a single computing device, or distributed in a network constituted by a plurality of computing devices, optionally they may be realized with program codes executable by computing devices, thereby they may be stored in storage devices and executed by computing devices, and in some cases, the steps as shown or described may be performed in sequences different from the sequences herein, or they may be made into IC modules, or a plurality of modules or steps among them are made into a single IC module. In this way, the present disclosure is not limited to the combination of any specific hardware and software.

The above are merely preferred embodiments of the present disclosure and are not intended to limit the present disclosure. To those skilled in the art, the present disclosure may have various modifications and changes. All modifications, equivalent substitutions and improvements made within the spirit and principle of the present disclosure shall fall within the protection scope of the present disclosure.

What is claimed is:

1. A wireless signal transmission method, comprising:
   transmitting, by a transmitting station, a wireless signal to one or more receiving stations, wherein the wireless signal comprises a first portion and a second portion, the first portion being a trigger frame with a first type of frame format which can be independently decoded, the second portion being a specific signal with a second type of frame format; and
   receiving, by the transmitting station, a radio frame transmitted by at least one of the plurality of receiving stations,
   wherein a Media Access Control (MAC) layer frame header of the trigger frame comprises indication information of at least one of a frame type and a subframe type, the at least one of the frame type and the subframe type is used for indicating that the trigger frame is configured to trigger the plurality of receiving stations to transmit the radio frame, and the specific signal with the second type of frame format is provided after the trigger frame,
   wherein a condition of deciding that the specific signal with the second type of frame format is provided after the trigger frame comprises: the frame type of the trigger frame and the indication information or a sequence in the trigger frame implying that the specific signal with the second type of frame format is provided after the trigger frame; and
   wherein the indication information or the sequence in the trigger frame further implying that the specific signal comprises at least one of: a length and a format.

2. The method according to claim 1, wherein the trigger frame comprises a physical layer frame header with the first type of frame format and a data payload with the first type of frame format, the physical layer frame header with the first type of frame format is configured to assist the receiving station in receiving the data payload with the first type of frame format, the data payload with the first type of frame format is configured to trigger the receiving station to transmit the radio frame to the transmitting station; and the specific signal with the second type of frame format is used for assisting the receiving station in preparing the radio frame to be transmitted to the transmitting station.

3. The method according to claim 1, wherein the first type of frame format comprises a non-High-Throughput (non-HT) format or a modulation and coding scheme the same as the non-HT format; and the second type of frame format comprises a High-Efficiency (HE) format.

4. The method according to claim 1, wherein the specific signal with the second type of frame format is a training signal or spreading signal or supplementary signal with the second type of frame format, the training signal comprises one or more training sequences; and no interframe space exists between the trigger frame and the training signal or the spreading signal or the supplementary signal.

5. The method according to claim 1, wherein the specific signal with the second type of frame format is a Null Data Packet (NDP) comprising a training signal or spreading signal with the second type of frame format, the training signal comprises one or more training sequences; and a space between the NDP and the trigger frame is a Short Inter Frame Space (SIFS).

6. The method according to claim 1, wherein a physical layer frame header of the trigger frame comprises indication information of a transmission duration of the trigger frame.

7. The method according to claim 1, wherein the MAC layer frame header of the trigger frame comprises a transmission duration of the specific signal with the second type of frame format, a duration of one or more radio frames transmitted by the receiving station, a duration of one or more response frames transmitted by the transmitting station, and indication information of interframe space duration thereamong.

8. The method according to claim 1, wherein the trigger frame comprises at least one of following indication information of a training signal with the second type of frame format:
   indication information indicating whether or not carrying the training signal with the second type of frame format;
   indication information of transmission duration or the number of training sequences of the training signal with the second type of frame format; and
   indication information of a transmitted parameter of the training signal with the second type of frame format.

9. A wireless signal transmission method, comprising:
   receiving, by a plurality of receiving stations, a wireless signal transmitted by a transmitting station, wherein the wireless signal comprises a first portion and a second portion, the first portion being a trigger frame with a first type of frame format which can be independently decoded, the second portion being a specific signal with a second type of frame format; and
   transmitting, by at least one of the plurality of receiving stations, a radio frame to the transmitting station according to the received wireless signal,
   wherein the specific signal with the second type of frame format is: a training signal or spreading signal with the second type of frame format, the training signal comprising one or more training sequences; and no interframe space existing between the trigger frame and the training signal or the spreading signal; or a Null Data Packet (NDP) comprising a training signal or spreading signal with the second type of frame format, the training signal comprising one or more training sequences; and a space between the NDP and the trigger frame being a Short Inter Frame Space (SIFS), and
   wherein the transmitting, by at least one of the plurality of receiving stations, a radio frame to the transmitting station according to the received wireless signal comprises: measuring, by the receiving station, one or more training sequences comprised in the training signal with the second type of frame format, and estimating, by the receiving station, one of following information: an adjustment parameter of the to-be-transmitted radio frame; channel state information; and channel busy/idle information.

10. The method according to claim 9, wherein the first type of frame format comprises a non-High-Throughput (non-HT) format or a modulation and coding scheme the same as the non-HT format; and the second type of frame format comprises a High-Efficiency (HE) format.

11. The method according to claim 9, wherein the adjustment parameter comprises at least one of: a frequency offset adjustment amount; a transmission power adjustment amount; and a transmission time delay adjustment amount.

12. The method according to claim 9, wherein the transmitting, by at least one of the plurality of receiving stations, a radio frame to the transmitting station according to the received wireless signal comprises: estimating, by the receiving station, channel busy/idle information according to the received wireless signal in at least one of the following ways:
- estimating the channel busy/idle information by measuring the specific signal with the second type of frame format;
- estimating the channel busy/idle information by detecting within interframe space time after the specific signal with the second type of frame format; and
- estimating the channel busy/idle information by detecting within interframe space time before the specific signal with the second type of frame format.

13. The method according to claim 12, wherein the manner of detecting within interframe space time after the specific signal with the second type of frame format or the manner of detecting within interframe space time before the specific signal with the second type of frame format comprises: Clear Channel Assessment (CCA), mid-packet detection, and energy detection.

14. The method according to claim 9, wherein the transmitting, by at least one of the plurality of receiving stations, a radio frame to the transmitting station according to the received wireless signal comprises: after finishing parsing the trigger frame, preparing, by the receiving station, a radio frame to be transmitted to the transmitting station, and transmitting, by the receiving station, the radio frame after a SIFS duration upon completion of the specific signal with the second type of frame format.

15. A transmitting station, comprising:
a processor; and
a memory configured to store instructions executable by the processor;
wherein the processor is configured to perform:
transmitting a wireless signal to one or more receiving stations, wherein the wireless signal comprises a first portion and a second portion, the first portion being a trigger frame with a first type of frame format which can be independently decoded, the second portion being a specific signal with a second type of frame format; and
receiving a radio frame transmitted by at least one of the plurality of receiving stations,
wherein a Media Access Control (MAC) layer frame header of the trigger frame comprises indication information of at least one of a frame type and a subframe type, the at least one of the frame type and the subframe type is used for indicating that the trigger frame is configured to trigger the plurality of receiving stations to transmit the radio frame, and the specific signal with the second type of frame format is provided after the trigger frame;
wherein a condition of deciding that the specific signal with the second type of frame format is provided after the trigger frame comprises: the frame type of the trigger frame and the indication information or a sequence in the trigger frame implying that the specific signal with the second type of frame format is provided after the trigger frame; and
wherein the indication information or the sequence in the trigger frame further implying that the specific signal comprises at least one of: a length and a format.

* * * * *